UNITED STATES PATENT OFFICE.

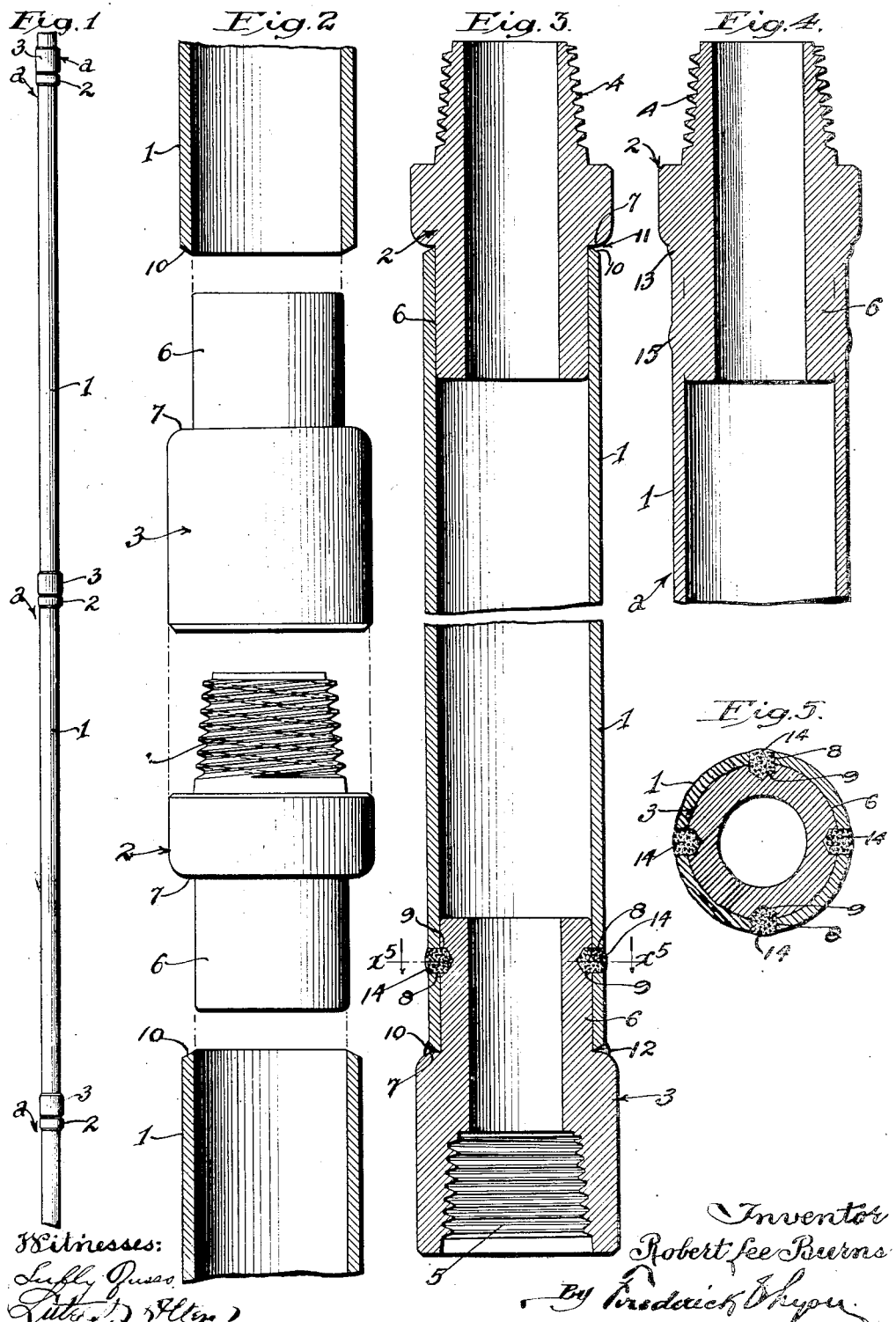

ROBERT LEE BURNS, OF TAFT, CALIFORNIA.

DRILL-STEM AND METHOD OF MAKING THE SAME.

1,236,145.   Specification of Letters Patent.   Patented Aug. 7, 1917.

Application filed November 4, 1916. Serial No. 129,495.

*To all whom it may concern:*

Be it known that I, ROBERT LEE BURNS, a citizen of the United States, residing in Taft, in the county of Kern and State of California, have invented new and useful Drill-Stems and Methods of Making the Same, of which the following is a specification.

This invention relates to drill stems used more especially in drilling or boring wells and relates more particularly to hollow drill stems such, for instance, as are employed in rotary well drilling.

Hollow drill stems of the character previously known are constructed of pipe sections and coupling members, the pipe sections being upset at their ends or otherwise thickened or reinforced, and threads cut in the upset portions, and the pipe sections then screwed onto the coupling members. Besides the tendency of the pipe sections to unscrew with such construction, it is obvious that the upsetting and threading of the ends of the pipe sections is relatively expensive as both operations must be performed in suitable machines, and an object of this invention is to produce a drill stem the pipe sections of which cannot unscrew from the coupling members and also to minimize the cost of manufacture of the drill stem.

Another object is to so connect the pipe sections and coupling members to one another that maximum strength will be secured at the joint, in fact by this invention the construction is as strong as or stronger at the joint than at other portions of the drill stem.

Other objects and advantages will appear in the subjoined detail description.

The accompanying drawings illustrate the invention:

Figure 1 is a side elevation of the newly invented drill stem produced by the newly invented method, portions being broken away to contract the view.

Fig. 2 is an enlarged side view of the coupling members and fragments of two pipe sections disassembled, the pipe sections being shown in vertical mid section.

Fig. 3 is a vertical mid section of a pipe section and coupling members at opposite ends of said pipe section, a portion of the pipe section being broken away to contract the view. The coupling member at the upper end is shown merely driven into place, and the coupling member at the lower end is shown as having been driven into place. In the lower portion of said figure bodies of metal are shown as they would appear when melted into place, but unfused with the adjacent portions of the pipe section and coupling member.

Fig. 4 is a view analogous to the upper portion of Fig. 3 after the welding portion has been completed.

Fig. 5 is a plan section on line indicated by $x^5$—$x^5$, Fig. 3.

The drill stem with parts broken away to contract the view is shown in Fig. 1 and comprises pipe or tubular stem sections 1 and tubular male and female coupling members 2, 3 respectively, the male coupling member being provided externally with double tapered pipe threading 4 and the female coupling member being provided internally with double tapered pipe threading 5. Each pipe section 1 together with one of each of the coupling members 2, 3 at its opposite ends forms a unit $a$ of the drill stem.

Each of the coupling members 2, 3 is provided with a reduced cylindrical end portion 6 terminating in an external annular shoulder 7. The pipe sections 1 may be forced onto the coupling members by mechanical power, for instance by hydraulic pressure, and the fit between the pipe sections and cylindrical portions 6 is preferably so close that a pressure of about twenty-five tons is employed to telescope the pipe sections onto said cylindrical portions. After the pipe sections 1 have been thus forced on to the cylindrical portions 6 as in Fig. 3, a perforation or perforations 8 of any suitable number may be formed in the pipe sections 1 and recesses 9 may be formed in the tubular portion 6 to register with the perforations as in the lower portion of Fig. 3. The perforation or perforations 8 and recess or recesses 9 are preferably formed by simply drilling through the pipe sections 1 into the cylindrical portions 6 with a suitable drill or drills. The recesses 9 do not perforate the walls of the tubular portions 6 but there is an abundance of metal between the bottoms of the perforations and the inside faces of the cylindrical portions so that said cylindrical portions will not be weakened to any appreciable extent adjacent the recesses 9. The pipe sections 1 may have beveled ends 10 so that when the pipe sections and coupling members have been driven together there will be annular grooves 11, wedge shaped in cross section, between the ends of the pipe sections and the shoulders 7.

After the perforations 8 and recesses 9 have been formed as in Fig. 3, or previously if desired, a body 12 of metal is melted into each of the grooves 11 as in the lower portion of Fig. 3, and this may be accomplished by the use of an oxy-acetylene torch, or the like, the heat of the flame of said torch not only melting the body of metal into the groove but also fusing said body with the adjacent metal of the pipe sections 1 and shoulder 7 so as to produce the weld 13 as in Fig. 4, thus firmly and permanently uniting the pipe sections to the coupling members.

It is understood that the weld 13 may of itself be sufficient to firmly hold the pipe section and coupling member against separation, and in that event the perforations 8 and recesses 9 need not be formed. However, as an additional safe-guard against separation of the pipe sections and coupling members, it is desirable to employ additional means for binding them together and in such case the perforations 8 and recesses 9 will be formed as hereinbefore described and bodies 14 of metal will be applied and melted into the perforations 9, as in the lower portion of Fig. 3, by the use of an oxy-acetylene torch, or the like, and the metal of the pipe sections 1 and cylindrical portions 6 adjacent the perforations and recesses will be fused by the heat of the flame of the torch with the bodies thus applied so as to form the welds 15 as in Fig. 4.

The requisite number of units $a$ will be coupled together as required when placing the stem in the well, thus completing the drill stem.

Though the invention has been illustrated and described in the form of a drill stem, it is understood that the invention could as readily be embodied in the form of a sucker line or other similar devices comprising members welded together.

I claim:

1. The method of making a drill stem or the like, which method comprises forcing a pipe section onto a coupling member, forming a perforation in the pipe section and a recess extending only part way through the wall of the coupling member in registration with said perforation, and fusing a body of metal with portions of the pipe section and coupling member adjacent the perforation and recess respectively.

2. The method of making a drill stem or the like, which method comprises forcing a pipe section onto a shouldered coupling member, forming a perforation in the pipe section and a recess in the coupling member in registration with said perforation, fusing a body of metal between one end of the pipe section and the shoulder of the coupling member, and fusing a body of metal with portions of the pipe section and coupling member adjacent the perforation and recess respectively.

3. The method of making a drill stem or the like, which method consists in applying considerable pressure to force a pipe section onto a coupling member, forming a perforation in the pipe section and a recess extending only part way through the wall of the coupling member in registration with one another, melting a body of metal into the perforation and recess, and applying sufficient heat to said body and the metal of the pipe section and coupling member adjacent said body to fuse said body, pipe section and coupling member together.

4. A drill stem unit comprising a shouldered coupling member, a pipe section fitting the coupling member, there being a groove between the shoulder and the adjacent end of the pipe section, and a body of metal in said groove fused with the adjacent portions of the pipe section and coupling member respectively.

5. A drill stem unit comprising a coupling member having a recess extending only part way through the wall thereof, a pipe section fitting the coupling member, and provided with a perforation in registration with the recess, and a body of metal in the perforation and recess fused with the adjacent portions of the pipe section and coupling member.

6. A drill stem unit comprising a shouldered coupling member having a recess, a pipe section fitting the coupling member and provided with a perforation in registration with the recess, there being a groove between the shoulder and the adjacent end of the pipe section, a body of metal in the perforation and recess fused with the adjacent portions of the pipe section and coupling member respectively, and a body of metal in said groove fused with the adjacent portions of the pipe section and coupling member respectively.

7. A drill stem unit comprising a shouldered coupling member, a pipe section fitting the coupling member and having a beveled end, there being a groove of wedge-shaped cross section between the shoulder and said beveled end, and a body of metal in said groove fused with the adjacent portions of the pipe section and coupling member respectively.

Signed at Taft, California, this 28th day of October 1916.

ROBERT LEE BURNS.

Witnesses:
T. J. O'BRIEN,
W. B. FINLEY.